United States Patent [19]
Pittman

[11] 3,831,307
[45] Aug. 27, 1974

[54] FISH LURE WITH FISH ATTRACTING RATTLE

[76] Inventor: Gloucester R. Pittman, 623 N. Stone Mountain-Lithonia Rd., Rt. 3, Stone Mountain, Ga. 30083

[22] Filed: July 17, 1973

[21] Appl. No.: 379,992

[52] U.S. Cl. ............................... 43/42.31, 43/42.24
[51] Int. Cl. ............................................ A01k 85/00
[58] Field of Search ............... 43/42.31, 42.24, 17.1, 43/17; 46/193, 191

[56]  References Cited
UNITED STATES PATENTS
2,844,907   7/1958   Merton ............................. 43/42.31
3,387,402   6/1968   Mays ................................ 43/42.31
3,760,528   9/1973   Moore .............................. 43/42.24

*Primary Examiner*—Warner H. Camp
*Attorney, Agent, or Firm*—James A. Hinkle

[57]  ABSTRACT

A fish lure for attracting fish by emitted sound wherein the sound comes from a rattle mechanism attached to the artificial bait body. The rattle is either a hard hollow container having loosely disposed balls therein to effect the noise, or it may be a conventional bell with a clacker. Anchor means are attached within the bait body to maintain the rattle firmly attached. Other parts of the lure are also attached by the disclosed anchor means.

10 Claims, 5 Drawing Figures

PATENTED AUG 27 1974  3,831,307
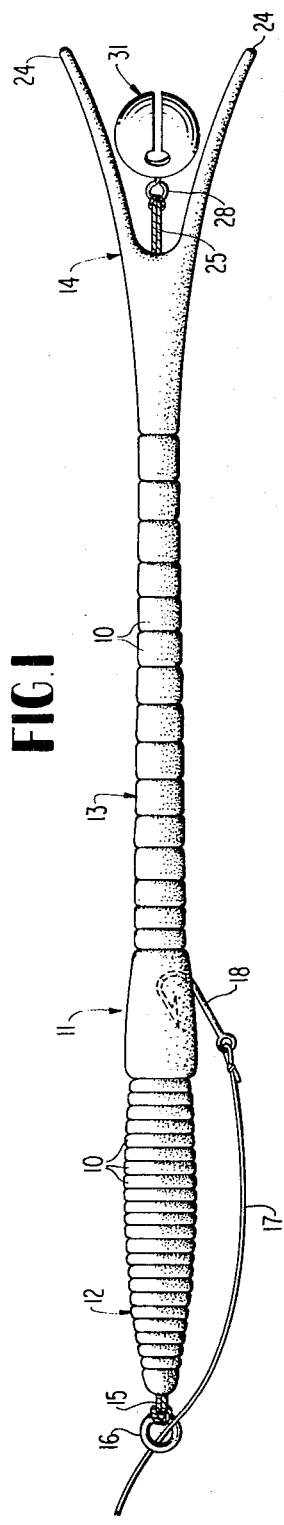
FIG.1
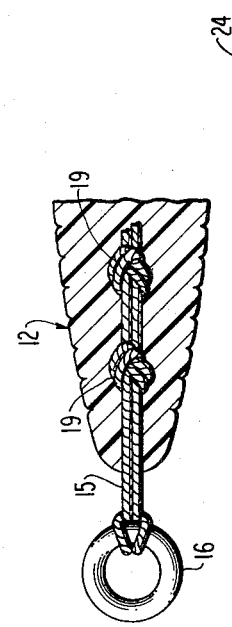
FIG.2
FIG.3
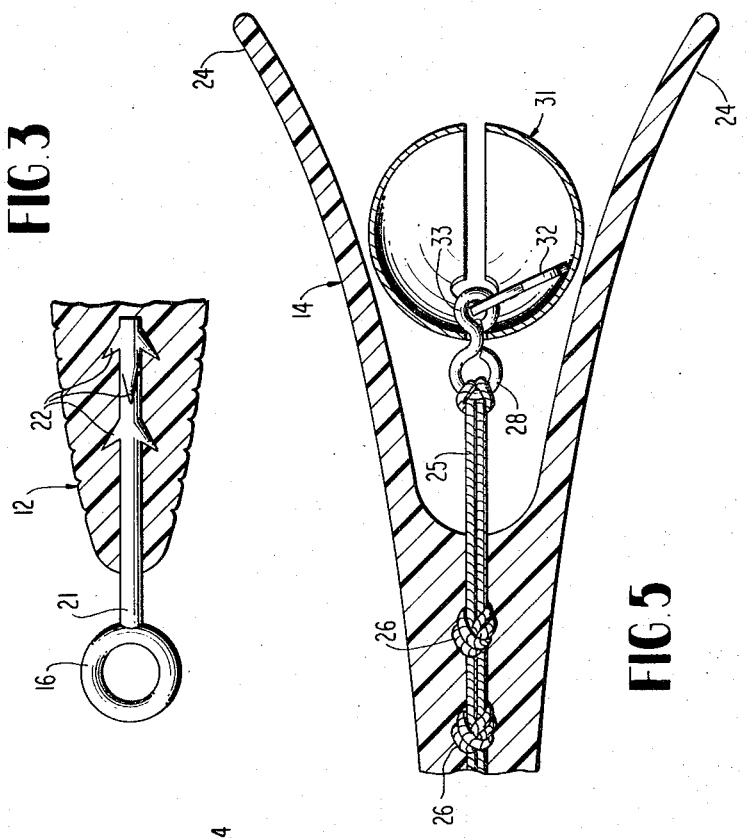
FIG.5
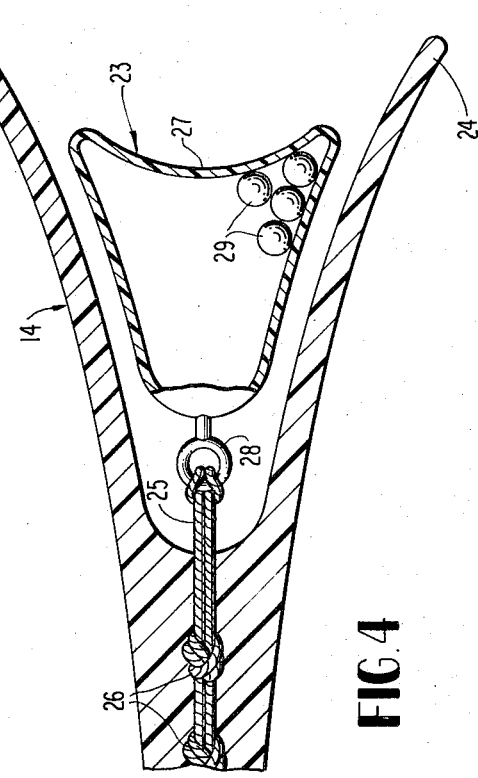
FIG.4

FISH LURE WITH FISH ATTRACTING RATTLE

The present invention generally pertains to fish lures and, more particularly, to fish lures with fish attracting rattling mechanisms attached thereto.

It is well known that certain types of fish lures are more adept at attracting fish than other types. This particular invention relates specifically to artificial fish lures of the type in which the artificial lure is so constructed as to emit a fish attracting noise when drawn through the water to thereby make the bait more attractive to the fish.

Therefore an object of the present invention is the provision of a fish lure which, when drawn through the water, emits a fish attracting noise.

Another object of the invention is the provision of an artificial fish lure in which the fishing line and hook assembly is attached to the fish lure in a novel manner.

Another object of the invention is the provision of an artificial fish lure which emits a fish attracting noise when pulled through the water and such noise is emitted by a rattling mechanism attached to the lure.

Another object of the invention is the provision of an artificial fish lure in which the fishing line is attached to the lure by means of a fastening device molded into the fish lure in such a manner as to prevent its removal during normal use of the lure and further of a rattling mechanism attached to the lure in a similar fashion.

A further object of the invention is the provision of a rattling mechanism designed to be attached to an artificial fish lure used in attracting fish wherein the rattling mechanism is preferably a bell or other rattle mechanism having one or more spherical balls enclosed in a suitable housing which reacts with the balls to produce a noise.

Fish lures in the prior art have utilized lights, colors and shapes to represent various baits and movements to the fish to be caught. Such devices have been known to be effective; however, there are certain disadvantages to each type of lure while there are none of the advantages of the presently proposed lure. Generally, the present invention utilizes a molded artificial rubber-like fish lure made in virtually any desired shape. The lure is normally attached to a line and impaled upon the fish hook of the line in such a manner that the fishing line is threaded through an eye attached to the lure by an attaching line suitably knotted or barbed to prevent its removal. At a suitable place on the lure a rattle mechanism, such as a bell or a housing enclosing spherical balls, is attached in a manner similar to that of the line eye.

Other objects, advantages and capabilities of the invention will become apparent from the following description, taken in conjunction with the accompanying drawings showing two preferred embodiments of the invention.

In the drawings:

FIG. 1 illustrates an artificial fish lure which embodies the elements of the present invention;

FIG. 2 illustrates one method of attaching the line eye to the artificial lure by means of anchor knots in the attaching line;

FIG. 3 shows a second embodiment of the means for attaching the line eye by use of a barbed attaching rod embedded in the lure body;

FIG. 4 shows one embodiment of the rattle used with the lure; and

FIG. 5 illustrates a second embodiment of the rattle mechanism shaped as a bell.

Referring to the drawings wherein like reference characters designate corresponding parts throughout the several figures, the fish lure as contemplated in the present invention is generally shown by the numeral 11. The lure 11 comprises a head, or forward section, 12, a body portion 13 and a tail, or rear section, 14. The body of the lure 11 preferably has certain designs molded in it by which the fish are more easily attracted. These indentations, or body designs, 10, are peripherally disposed around the lure's body in such a manner as to present to the fish a bait member which closely resembles a wide variety of worms or other baits. Of course, it is obvious that the number and spacing of the indentations about the lure's body may vary from lure to lure and the description herein shall not be deemed to limit the variety of designs possible.

The forward section of the lure comprises a means by which the fish line is attached to the lure. This is done by providing an attaching line 15 which is embedded within the forward section as shown in FIG. 2 and FIG. 3. At the distal end of the attaching line is a line eye 16 through which the fish line is threaded in order to maintain its close proximity to the forward section of the lure when in use. The fishing line is shown by numeral 17 and at its free end thereof a fish hook 18 is attached. The hook 18 is conventionally threaded or embedded in the lure 11. The fisherman using the lure will decide the best placement for the hook 18 and, while FIG. 1 indicates a more or less central placement in the body 13, it should be recognized that the hook may be placed in a great variety of locations.

As shown in FIG. 2, the attaching line 15 with the attached line eye 16, is maintained in fixed contact with the lure body 13 by means of anchor knots 19. In the particular embodiment shown in FIG. 2, the attaching line is a filament member which may be knotted in several places, as shown, with little difficulty.

A second embodiment of the attaching means for the line eye is shown in FIG. 3 wherein the line eye 16 is attached to a barbed attaching means 21 which has a plurality of barbed members 22 along its length to firmly embed it in the forward section of the lure 11. The barbs 22 thereby act as anchor members much like the anchor knots 19 to prevent the pulling of the line eye out of the lure body. No particular significance is attached to the shape of the barbs 22 since any number of configurations may be utilized to effectively hold the line eye in the lure body.

The tail section of the lure is shown in two different embodiments as depicted in FIGS. 4 and 5. A concept of the present invention is to provide a lure by which a certain noise is emitted in order to attract the fish more readily. Consequently, each of the embodiments shown comprise a rattle device of some type to promote the desired results of the present invention.

In FIG. 4 there is shown one embodiment of the invention in which a rattle 23 is provided within the tail section 14 of the lure body. The tail section 14 is preferably of a split tail variety having a pair of tail halves 24 which encompass the rattle body 23 except that the rearmost portion of the split tail is completely open. The rattle 23 is connected to the tail section 14 by means of an anchor line 25 which, like the attaching line 15, is provided with a plurality of anchor knots 26 so as to firmly embed the anchor line 25 within the tail section 14 to prevent its removal. The rattle 23 comprises a body 27 which is preferably of a hard substance and attached to a connecting eye 28. The eye 28 is then attached to the anchor line 25 thereby securing the rattle body to the tail section 14. Within the molded body 27 are a plurality of rattle balls 29 which are freely disposed within the body to impart a rattle sound by interaction with the rattle body when the rattle 23 is vibrated due to the motion of the lure through the water. It is well known that such a sound is very attractive to fish and produces desired results for the fisherman. Of course the body 27 may be of any reasonable shape and still provide the desired response. However, in an environment such as the split tail 14 a shape such as is shown in FIG. 4 is preferable inasmuch as it allows the greatest degree of flexibility to the body design and yet fits well within the cavity formed by the tail halves 24.

The second embodiment of the rattle mechanism is shown in FIG. 5 and is indicated by numeral 31. The rattle 31 in this embodiment comprises a bell shaped member with a clacker 32 that freely swings upon a pivot 33 attached to the anchor line 25 by means of a connecting eye 28. The bell 31 may also be of any desired shape and configuration. However, it has been found that a conventional spherical member with a clacker 32 freely attached within the bell is a desired configuration. It should be indicated that the bell 31 may well be equipped with only a ball within the bell housing to effect the rattle noise. Such a configuration is well known and need not be described here. The bell rattle 31 operates precisely as the rattle 23 which was previously described and is deemed to be just as effective in attracting fish.

It is the custom of many fishermen to fabricate their own plastic lures such as described herein. The present invention makes it very easy for the amateur fisherman who constructs his own lure to incorporate the present invention with a minimum of trouble. In addition, commercial manufactuers of lures may incorporate the present invention without difficulty. When a normal plastic lure is manufactured, a plastic substance is poured into a mold and left to harden. If it is desired to incorporate the elements of the present invention in the manufacture of a plastic lure, the manufacturer would normally provide an attaching line and line eye 16 to the mold before pouring of the plastic material takes place. The anchor knots 19 would also be provided to the attaching line and be placed a sufficient length along the mold to prevent the attaching line 15 from being withdrawn easily. In addition, at the rear or tail section 14 of the lure, the manufacturer would also provide an attaching line 25 with the desired number of anchor knots to which would be attached either rattle 23 or rattle 31. If desired, the attaching line 25 would extend throughout the entire length of the lure body and this would obviously result in a unitary system which would prevent the line eyes or rattles from being withdrawn from the lure. However, it is normally difficult to align a member throughout the entire length of the lure body during normal manufacture. Consequently, the present invention embodies the concept of a plurality of attaching lines to perform the desired task. Once the attaching lines have been placed within the mold the manufacturer then pours the plastic substance which comprises the lure 11 into the mold and lets it harden. Afterwards the lure is removed from the mold and the line eyes and rattles are firmly embedded within the lure. To make sure that the attaching lines are centered within the lure body, a convenient process is to place a needle through the mold and through the attaching line to maintain the attaching line within the center of the mold while the plastic material is being poured and is allowed to harden.

It is known that the manufacturer may make the plastic lures in a variety of consistencies. Therefore, if a softer plastic consistency is desired, then the attaching line will have to have more anchor knots per unit of size than would be required on a more rigid lure. While the present invention has referred to plastic lures or bait bodies, it should not be construed that the present invention is not capable of being utilized with lures made from other materials such as wood or hard plastics. In addition, the present invention has described an elongated plastic lure with a split tail rear section. Such should also not be construed to be limiting inasmuch as any shape lure is considered adaptable to the present invention.

In utilizing the present invention the lure is placed in the body of water in which the fisherman desires to catch fish and then pulled along through the water with small jerks upon the fishing line which will then make the rattles emit the desired sound thereby attracting fish in great quantities.

Various modifications may be made in the invention without departing from the spirit and scopes thereof, and it is desired therefore that only such limitations shall be placed thereon as are imposed by the prior art and are set forth in the appended claims.

What is claimed is:

1. A fish lure for attracting fish by means of emitted sound in the water comprising an artificial bait body having a head and a tail, means for attaching the bait body to a fishing line so as to enable the user to pull the bait body through the water, sound emitting means attached to the bait body by a flexible attaching line, the attaching line being molded into the bait body during manufacture and having anchor means integral therewith to prevent dislodgement of the anchor means from the bait body, the attaching line anchor means comprising a plurality of enlarged knotted portions positioned along the attaching line, the sound emitting means comprising a rigid enclosure having a hollow interior, rattle means loosely disposed within the hollow interior of the rigid enclosure adapted to strike the sides of the enclosure when violent movement is imparted to the enclosure as the bait body is pulled through water thereby emitting fish attracting sounds.

2. The fish lure as claimed in claim 1 wherein the rattle means comprises a plurality of freely disposed hard spherical balls designed to strike the sides of the enclosure to emit the fish attracting sound.

3. The fish lure as claimed in claim 1 wherein the rattle means comprises a clacker attached in juxtaposition to the side wall of the enclosure, the clacker having one freely disposed end for interaction against the side wall of the enclosure to emit the fish attracting sound.

4. The fish lure as claimed in claim 3, wherein said enclosure is of a spherical configuration.

5. The fish lure as claimed in claim 1, wherein the means for attaching the bait body to a fishing line includes a line eye fixedly attached to the bait body by anchor means, said line eye anchor means comprises a flexible line having one end portion molded into the head of the bait body during manufacture and the other end portion connected to said eye, wherein said flexible line has a plurality of enlarged knotted portions along the line to serve as anchor bodies.

6. The fish lure as claimed in claim 5, wherein the rattle means comprises a plurality of freely disposed hard spherical balls designed to strike the sides of the enclosure to emit the fish attracting sound.

7. The fish lure as claimed in claim 5, wherein the rattle means comprises a clacker attached in juxtaposition to the side wall of the enclosure, the clacker having one freely disposed end for interaction against the side wall of the enclosure to emit the fish attracting sound, wherein the enclosure is of a spherical configuration.

8. The fish lure as claimed in claim 1, wherein the means for attaching the bait body to a fishing line includes a line eye fixedly attached to the bait body by anchor means, said line eye anchor means comprises a rigid elongated member having an eye at one end and with the other end being imbedded into the head of the bait body during manufacture, the imbedded portion of the elongated member having a plurality of barbed members projecting outwardly therefrom to serve as anchor bodies.

9. The fish lure as claimed in claim 8, wherein the rattle means comprises a plurality of freely disposed hard spherical balls designed to strike the sides of the enclosure to emit the fish attracting sound.

10. The fish lure as claimed in claim 8, wherein the rattle means comprises a clacker attached in juxtaposition to the side wall of the enclosure, the clacker having one freely disposed end for interaction against the side wall of the enclosure to emit the fish attracting sound, wherein the enclosure is of a spherical configuration.

* * * * *